United States Patent [19]

Twyman

[11] Patent Number: 5,200,219

[45] Date of Patent: * Apr. 6, 1993

[54] METHOD OF PREPARING GREEN BEANS AND THE RESULTING PRODUCT

[76] Inventor: Jeffrey R. Twyman, 893 W. Wooster St., Bowling Green, Ohio 43402

[*] Notice: The portion of the term of this patent subsequent to Sep. 19, 2006 has been disclaimed.

[21] Appl. No.: 811,351

[22] Filed: Dec. 20, 1991

Related U.S. Application Data

[63] Continuation of Ser. No. 143,841, Jan. 14, 1988, Pat. No. 5,151,284, which is a continuation-in-part of Ser. No. 38,501, Apr. 15, 1987, Pat. No. 4,867,996.

[51] Int. Cl.⁵ .......................... A23B 7/00; A23B 7/04; A23B 7/05
[52] U.S. Cl. ..................... 426/106; 426/309; 426/310; 426/324; 426/325; 426/327; 426/335; 426/410; 426/415; 426/419; 426/506; 426/524
[58] Field of Search ............... 426/106, 324, 325, 327, 426/335, 309, 310, 270, 506, 524, 410, 415, 419, 268, 267

[56] References Cited

U.S. PATENT DOCUMENTS

| | | | |
|---|---|---|---|
| 1,450,866 | 4/1923 | Peters | 426/506 |
| 1,708,253 | 4/1929 | Bell et al. | 426/506 |
| 2,531,463 | 11/1950 | Pryor et al. | 426/318 |
| 3,450,543 | 6/1969 | Badran et al. | 426/415 |
| 3,814,820 | 6/1974 | Busta | 426/335 |
| 4,001,443 | 1/1977 | Dave | 426/326 |
| 4,857,350 | 8/1989 | Iwasaki et al. | 426/506 |

*Primary Examiner*—Jeanette Hunter
*Assistant Examiner*—Mary S. Mims
*Attorney, Agent, or Firm*—Marshall & Melhorn

[57] ABSTRACT

Fresh green beans in a plastic container that have an extended shelf life, the green beans being treated to slow down the normal deterioration of the beans by immersing the green beans in water at a temperature and for a time sufficient to cool the interior of the beans to that temperature, to sanitize the beans by removing spores and bacteria, and to replace some of the water lost by the beans after harvesting. After the immersion step, the moisture is removed from the surface of the green beans at a temperature of 40° F. to 44° F., and thereafter the beans are graded and packed into the plastic container, keeping the bean temperature below 48° F.

21 Claims, No Drawings

METHOD OF PREPARING GREEN BEANS AND THE RESULTING PRODUCT

This application is a continuation of application Ser. No. 07/143,841, filed Jan. 14, 1988, now U.S. Pat. No. 5,151,284, which is a continuation-in-part application of Ser. No. 038,501, filed Apr. 15, 1987, now U.S. Pat. No. 4,867,996.

The present invention relates to methods of preparing fresh green beans for fresh produce sale by slowing down normal deterioration of the beans to extend the shelf life and to products made therefrom.

BACKGROUND OF THE INVENTION

It is old in the art to treat fresh lettuce for preserving the same by dipping the same in a cool (freezing point to 40° F.) aqueous solution of potassium nitrate or sodium benzoate as disclosed in U.S. Pat. No. 2,698,804.

Vegetables and fruits are preserved for fresh product sale in U.S. Pat. No. 2,894,843 by contacting the vegetables such as potatoes with an aqueous solution of a vegetable reducing agent such as calcium sulfate.

In general, although vegetables are treated with certain aqueous solutions as in the above U.S. patents, green beans are not mentioned as one of the treated vegetables in such prior art. Green beans are different in nature from potatoes, apples, etc. in that green beans do not have a relatively impervious skin, but rather have an outer covering with many outwardly projecting hairs that serve as guard hairs to trap fungal and bacterial spores. The resultant trapping of such spores, for example, complicates attempts to preserve the beans.

Green beans have been handled and maintained in a dry state to assist in preserving the beans for fresh green bean product sale. When used, post harvest treatments of fresh green beans involved attempts to air-cool the dry beans in a high humidity and in a non-aqueous environment as set forth in:

1. Wilhelm, L. R., "Forced Ventilation Cooling of Commercial Snap Beans Shipments", ASAE paper. Department of Agriculture Engineering, University of Tennessee, Knoxville, TN., No. 79-6518, p. 9.
2. Sistruck, W., "Influence of Post Harvest Storage of Snap Beans on Chemical and Physical Changes during Canning.", Food Research, Vol. 30, 1965, p. 240.
3. Platenius, et al., "Studies on cold Storage of Vegetables", U.S.D.A. Bulletin 602, p. 3.

Even with the cool air, high humidity treatment, the green beans suffer substantial weight losses beginning immediately after harvesting.

While cool temperatures appeared to slow the respiration and deterioration processes, an article by Gorini and Bouvilli, "Studies on Pre-Cooling and Storage of Some Varieties of Snap Beans", ACTA HORTICULTURE, Vol. 38, June 1974, pp. 507-29, warn green bean processors that it is impossible to cool the beans below 5° C. (40° F.) as such colder temperatures caused unwanted chilling injury to the beans.

OBJECTS OF THE INVENTION

It is an object of the present invention to provide a fresh green bean product with extended shelf life, apparatus for making the product, and a method of preparing the fresh green beans for fresh produce sales by slowing down the normal deterioration of the beans, the method comprising immersing fresh green beans in water at a time and temperature effective to clean the beans, partially sterilize the beans and stabilize the beans to prevent the normal rapid deterioration and thus extend the shelf life of the product.

It is another object of the present invention to provide a method of treating fresh green beans to preserve them for fresh produce sales by slowing down the normal deterioration of the beans by treating the beans in a wet state using critical times and temperatures. The treatment in the wet state is in sharp contrast to the normal practice of handling green beans in the dry state.

It is still a further object of the present invention to provide a novel product that is a plastic container having fresh green beans therewithin. The resultant product has a shelf life of at least about 4 days longer than normal, untreated green beans. The treated green beans of the present invention are immersed in water at about 32° F. to 38° F. for about 1 to 2 or 2½ hours and, immediately thereafter, processed by removing the surface water from each of the green beans at a temperature of about 40° F. to 44° F., just prior to grading and packing in the plastic containers.

Still another object of the present invention is to provide a method of preparing fresh green beans for fresh produce sales by slowing down the normal deterioration of green beans to extend the shelf life, wherein the method comprises the steps of:

a. immersing the freshly-picked green beans in water at a temperature of 32° F. to about 38° F.;
b. removing surface water from the beans at a temperature of about 40° F. to about 44° F.;
c. grading the beans to remove any deteriorated or unsatisfactory beans; and
d. placing the graded beans in a plastic container to provide a plastic container with green beans that have an extended shelf life, the container having walls that are permeable to oxygen and moisture to help preserve the beans.

These and other objects of the present invention will be apparent from the specification that follows and the appended claims.

SUMMARY OF THE INVENTION

The present invention provides a method of treating fresh green beans for fresh produce sales, the resulting beans having extended shelf life. The method is performed in the wet state that is in sharp contrast to the prior art practice of handling fresh green beans in the dry state.

The present invention provides a fresh green bean product, apparatus for preparing the product, and a novel method of treating the beans to obtain extended shelf life. The method includes the step of immersing fresh green beans in water at a temperature and for a time effective to clean the beans and stabilize the beans against normal deterioration. The time of immersion is generally about 1 to 2½ hours for the best shelf life extension. An immersion time of as low as 5 to 10 minutes or better 15 to 20 minutes will provide some benefit, for example, the addition to the shelf life of a few hours or up to ½ day or so.

In one embodiment, chlorine generally in an amount of about 10 to 40 ml per 700 ml of water is added to immersion bath, such chlorine addition being assisted by the pressure of the water on the beans to sterilize the beans and cool the interior of the beans and stabilize the beans.

The present invention provides a product and a method of preparing fresh green beans for fresh produce sales to extend the shelf life at least about 2 days, the method comprising the steps of (A) replacing moisture in the beans, (B) cleaning the beans to remove spores, (C) cooling the interior of the beans, and (D) stabilizing the beans against rapid deterioration, the steps A, B, C, and D being conducted by immersing the green beans in water for a time sufficient to perform steps A, B, C, and D.

Thus, in the method as defined above the temperature of the interior of each of the beans is kept at about 40° F. to 48° F. during subsequent steps of (E) removing surface water from the beans, (F) grading the beans, (G) packing the beans in containers, and (H) storing the beans.

Good results have been obtained when the temperature of each bean is controlled throughout steps (A) to (H) so that the temperature of the interior of the beans is kept at about 32° F. to 48° F.

The present invention provides a preferred method of preparing fresh green beans for fresh produce sales by slowing down deterioration of the beans to extend the shelf life, the method comprising the steps of:
  a. Immersing fresh green beans in water at a temperature of about 32° F. to 38° F. to clean the beans and slow down the normal deterioration of the beans; and
  b. Removing surface water from the beans at a temperature of about 40° F. to 44° F. for sale in which the beans have an extended shelf life of at least about 2 days.

The present invention also provides a novel product of fresh green beans in a plastic container such as a cellophane bag, the fresh green beans having a shelf life that is at least 4 days longer than other packaged green beans or loose, bulk green beans. The fresh green beans of the present invention are treated to slow down the normal deterioration of the green bean by a method that includes the steps of:
  a. immersing the freshly-picked green beans in water at a temperature of 32° F. to about 38° F.;
  b. removing surface water from the beans at a temperature of 40° F. to about 44° F.;
  c. grading the beans to remove any deteriorated or unsatisfactory beans; and
  d. placing the graded beans in a plastic container to provide a plastic container with green beans that have an extended shelf life, the container having walls that are permeable to oxygen and moisture to help preserve the beans.

In the above method, the green beans in step c. and d. are maintained at about 40° F. to 48° F. and the beans placed in the plastic container at that temperature, the temperature of the beans never rising above about 48° F. and preferably a range of at about 40° F. to 46° F. Immediately after bagging in the plastic containers such as a polyethylene bag or a regenerated cellulose bag, the plastic containers with green beans therein are placed in cold storage at a temperature of about 40° F. to 45° F. After cold storage, the green beans in the plastic container last on the fresh produce sale shelves at least about 4 days longer (and up to 6 or 8 days longer) than normally handled fresh green beans.

DETAILED DESCRIPTION OF THE INVENTION

In contrast to normal green bean processing in which the beans are maintained in the dry state and at a temperature about 40° F., the present invention provides a method of taking the freshly picked green beans, cooling the beans and holding the temperature at about 32° F. (freezing point—still liquid at 38° F. in a wet state) and thereafter maintaining the beans below about 48° F. and preferably below about 45° F. to 46° F., as the beans are treated to remove surface moisture, graded, and packed in plastic containers. The beans are held below about 48° F., in the range of 40° F. to 48° F. in cold storage to provide the shelf life properties.

The temperature of the cold water of the immersing step is generally about 32° F. to 38° F. and preferably about 33° F. to 35° F. The temperature of the green beans during the step of removing surface water is generally about 40° F. to 44° F. and preferably about 41° F. to 42° F.

The immersing step is conducted generally about 1¼ or 1½ up to 2 to 2¼ hours, and preferably about 1¾ to 2 hours. The step of removing surface water is generally conducted for about 1 to 5 minutes as long as the temperature of the beans is about 40° F. to 44° F.

As previously indicated, the immersing water may have, for best results, a chlorine addition in an amount of generally about 10 to 50 ml and preferably 15 to 25 ml of chlorine per 700 ml of water. The immersing water also may have an addition of calcium in the form of calcium carbonate in an amount of generally about 10 to 50 ml and preferably 15 to 25 ml of a saturated solution of calcium carbonate per 700 ml of water. The immersing bath may have an addition of food-grade citric acid, the citric acid being used sometimes to adjust the acidity of the immersing water to preferably about 5.3 to 6.7 or optimally about 5.8 to 6.2. The immersing water, preferably for economy and efficiency, is in a bath such as a long tank or a U-shaped tank in which the water is continuously circulated and filtered at 32° F. to 38° F., the filtering helping to remove spores and bacteria to sanitize the beans, clean the beans and preserve the beans.

It has been found that the water bath and, more specifically, the chlorine addition tend to seal the ends of any broken beans, making it less important to remove them during the grading process. In essence, the chlorine bleaches the enzymes (bean juice) released due to the broken bean, causing a whitish appearance as opposed to the normal brown appearance. The white bleached look is preferable from a marketing perspective to the dark brown end of an untreated broken bean.

The preferred plastic container is a cellophane or regenerated cellulose bag or pouch, although polyolefin bags including polyethylene, polypropylene and polybutylene containers can be used. Linier low density polyethylene can be used alone or in admixture with high density or low density polyethylene or copolymers of ethylene and vinyl acetate. As is known the preferred cellophane material is regenerated cellulose made from the viscose process.

The walls of the plastic container are generally about ½ to 3 mils in thickness and preferably about 1 to 2 mils in thickness. The plastic material is permeable to oxygen and moisture. The water vapor is helpful for preserving the beans. The beans generally release $CO_2$ and absorb oxygen in storage and are preserved well in a high $CO_2$, low $O_2$ atmosphere.

The size of the container is such that a pint, a quart, or two quarts of beans can be packaged. By weight, one-half pound, one pound or two pounds, and up to fifteen pounds of beans can be typically packaged for market.

The following example is intended to illustrate the invention and not to limit it in any way.

EXAMPLE

Freshly picked green beans were immersed in a tank in a water bath at a temperature of 33° F. Approximately 2 quarts of water were used per pound of green beans. The beans were immersed in the water for 2 hours. The water was recirculated and filtered through a diatomaceous earth filter to remove spores and bacteria. The pH of the water is 6. Chlorine in an amount of 15 ml of chlorine per 700 ml water was used, along with calcium in an amount of 15 ml of a saturated aqueous solution of calcium carbonate per 700 ml of water and 1 gram of food-grade citric acid per 700 ml of water.

After the immersion step, the green beans were moved immediately to a surface water removing station where cool air at 40° F. was blown over the beans, the temperature of the beans being 40° F. to 42° F. during this step.

Immediately thereafter, the treated cold beans, with the surface moisture substantially removed, were graded to sort out undesirable beans. The grading was done rapidly so that the temperature of the green beans at this stage was 42° F. to 44° F.

Immediately after grading, the beans (1-quart capacity) were packed into cellophane bags with a wall thickness of 1 mil. The beans, during packing, were at a temperature of 43° F. to 45° F.

Immediately, after packing, the green beans in the cellophane bags were placed in cold storage and maintained at a temperature of 40° F. for a week.

After cold storage, the green beans in the cellophane bag were placed on a fresh produce sales shelf. The green beans were of good quality for many days, the treated beans averaging 8 to 10 days on the shelf as compared to 2 or 3 days for untreated beans.

In the present invention, the temperature of the green bean is below 40° F. but the bean is immersed in cold water at 32° F. to 38° F. Thereafter, the bean temperature is carefully controlled at about 40° F. to 44° F. during the surface moisture removal step. The temperature of the bean rises only about 1° F. to 2° F. above that during the grading step and about 1° F. to 2° F. at the most during the packaging step. After packaging, the temperature of the bean is still controlled, in the cold storage at 40° F. to 48° F.

The resultant shelf life of the package of the thus preferably treated green beans is at least about 4 to 6 days longer than untreated beans making the present method and product a highly efficient way to process fresh green beans.

In U.S. Pat. No. 1,708,253 to Bell et al., celery is disclosed so being treated with an ice water spray as the celery passes by the water spray on a conveyor. Celery is much different than green beans and, in any event, there is no suggestion of immersing celery in water for any substantial period of time.

What is claimed is:

1. A method of preparing fresh green beans for fresh produce sales by slowing down normal deterioration of the beans to extend the shelf life, the method comprising immersing fresh beans in water at a temperature and time effective to clean the beans, and partially stabilize the beans to prevent normal rapid deterioration and extend the shelf life.

2. A method as defined in claim 1 in which chlorine is added to the water.

3. A method as defined in claim 1 in which the water contains about 10 ml to 50 ml of chlorine per 700 ml of water.

4. A method of preparing fresh green beans for fresh product sales to extend the shelf life at least about 2 days, the method comprising the steps of (A) replacing moisture in the beans, (B) cleaning the beans to remove spores, (C) cooling the interior of the beans, and (D) stabilizing the beans against rapid deterioration, the steps A, B, C, and D being conducted by immersing the green beans in water for a time sufficient to performs steps A, B, C, and D.

5. A method as defined in claim 4 in which the time of immersion in water is about 1 to 2¼ hours.

6. A method as defined in claim 4 in which the temperature of the interior of each of the beans is kept at about 40° F. to 48° F. during subsequent steps of (E) removing surface water from the beans, (F) grading the beans, (G) packing the beans in containers, and (H) storing the beans.

7. A method as defined in claim 6 in which the temperature of the interior of the beans is kept at about 32° F. to 48° F. during the steps of the process including steps A, B, C, D, E, F, G, and H.

8. A method as defined in claim 7 in which the water has a chlorine addition in steps A thru D.

9. A method of preparing fresh green beans for fresh produce sales by slowing down deterioration of the beans to extend the shelf life, the method comprising the steps of:

a. immersing the fresh green beans in water at a temperature effective to clean the beans and slow down the normal deterioration of the beans;

b. removing surface water from the beans at a temperature effective to prepare the beans for sale in which the beans have an extended shelf life of at least about 2 days.

10. A method as defined in claim 10 in which the temperature in step a. is about 33° F. to 35° F.

11. A method as defined in claim 10 in which the temperature in step b. is about 40° F. to 42° F.

12. A method as defined in claim 10 in which the temperature of step a is about 33° F. to 35° F. and the temperature of step b is about 40° F. to 42° F.

13. A method of preparing fresh green beans for fresh produce sales by slowing down the normal deterioration of the green beans to extend the shelf life, the method comprising the steps of:

a. immersing the freshly-picked green beans in water to a temperature effective to clean the beans and slow down the normal deterioration of the beans;

b. removing surface water from the beans at a temperature effective to prepare the beans for sale in which the beans have an extended shelf life;

c. grading the beans to remove any deteriorated or unsatisfactory beans; and d. placing the graded beans in a plastic container to provide a plastic container with green beans that have an extended shelf life, the container having walls that are permeable to oxygen and moisture to help preserve the beans.

14. A method as defined in claim 13 in which the temperature in step a. is about 33° F. to 35° F. and the temperature in step b. is about 40° F. to 42° F.

15. A method as defined in claim 13 in which the pH of the water in step a. is about 5.3 to 6.7.

16. A method as defined in claim 13 in which the pH of the water is about 5.8 to 6.2.

17. A method as defined in claim 13 in which there is the further step of filtering the water to remove spores and bacteria in step a.

18. A method as defined in claim 13 in which there is the step of maintaining the temperature of the green beans in step c. in the range of about 40° F. to 46° F.

19. A method as defined in claim 13 in which the plastic container is a polyethylene bag.

20. A method of preparing fresh green beans for fresh produce sales by slowing down deterioration of the beans to extend the shelf life, the method comprising the steps of:
 a. immersing fresh green beans in water at a temperature of about 32° F. to 38° F. to clean the beans and slow down the normal deterioration of the beans; and
 b. removing surface water from the beans at a temperature of about 40° F. to 44° F. to prepare the beans for sale in which the beans have an extended shelf life of at least about 2 days.

21. A method of preparing fresh green beans for fresh produce sales by slowing down normal deterioration of the beans to extend the shelf life, the method comprising immersing fresh beans in water at a temperature and time effective to clean the beans, and partially stabilize the beans to prevent normal rapid deterioration and extend the shelf life, the water having a chlorine addition in an amount of about 10 ml to 50 ml of chlorine per 700 ml of water, the water having a calcium carbonate addition in an amount of about 10 ml to 50 ml of a saturated solution of calcium carbonate per 700 ml of water, and the water having an addition of food-grade citric acid.

* * * * *